Oct. 4, 1960  T. MAIERSON ET AL  2,954,853
FRICTION MATERIAL FOR USE IN BRAKES
Filed Nov. 30, 1955  2 Sheets-Sheet 1
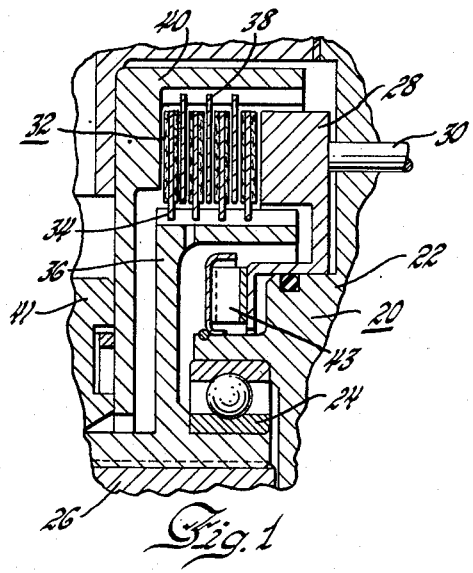
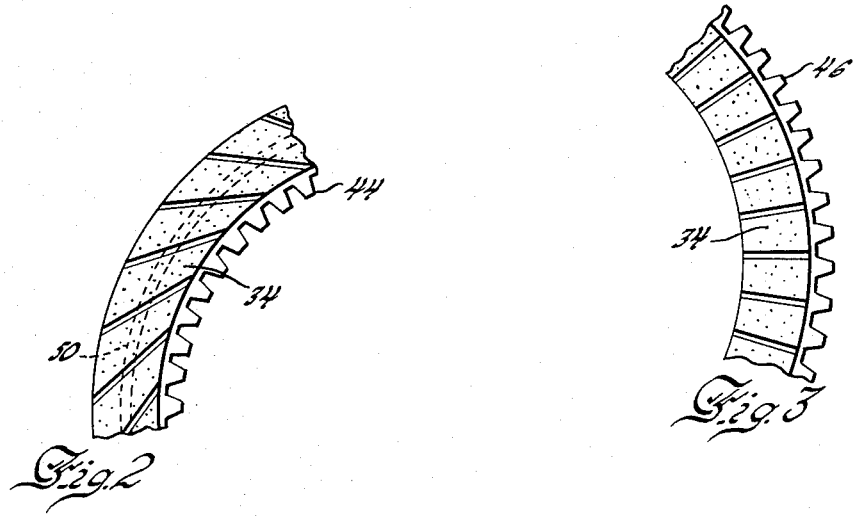
INVENTORS
Theodore Maierson
BY Robert A. Todd
THEIR ATTORNEY Oct. 4, 1960 T. MAIERSON ET AL 2,954,853
FRICTION MATERIAL FOR USE IN BRAKES
Filed Nov. 30, 1955 2 Sheets-Sheet 2

INVENTORS
Theodore Maierson
BY Robert A. Todd
John T. Mann
THEIR ATTORNEY

United States Patent Office 2,954,853
Patented Oct. 4, 1960

2,954,853

FRICTION MATERIAL FOR USE IN BRAKES

Theodore Maierson, Dayton, and Robert A. Todd, Trotwood, Ohio, assignors to General Motors Corporation, Detroit, Mich., a corporation of Delaware Filed Nov. 30, 1955, Ser. No. 550,107

3 Claims. (Cl. 188—234)

This invention relates to friction materials and is particularly concerned with friction facings for use in multiple disc type energy transmitting devices.

It is a specific object of the invention to provide a heat resistant, long wearing substantially nonmetallic friction facing for use in connection with energy transmitting devices.

In carrying out the above object it is a further object of this invention to provide a substantially nonmetallic brake lining or facing material which has a high degree of heat resistance, has extremely long wear, is inexpensive and is easy to apply to supporting members which may subsequently be assembled in a multiple disc brake for use in a bath of fluid.

In carrying out this object it is a further object to provide a friction material which can be extruded in sheet-like form and which may be firmly attached to a supporting element for subsequent use as a friction member.

A further object of the invention is to provide a friction material which includes a friction fortifying agent, a heat resistant filler, together with predetermined quantities of chemically refined vegetable cellulose (alpha cellulose).

A still further object of the invention is to provide a friction facing material which is made up from a mixture of powdered, chemically refined vegetable cellulose combined and blended with friction fortifying material and heat resistant fillers such as asbestos and mica, together with cork wherein said ingredients in homogeneously blended form are bonded together into a facing through the use of a highly heat resistant resinous binder which includes a phenolic resin and an acrylonitrile type of copolymer.

A still further object of the invention is to provide an energy transmitting device comprising a plurality of plates wherein alternate plates operate as a unit and wherein each plate of one set of the plates includes a facing on opposite sides thereof, said facing being a dense, highly heat resisting material formed from a blended mixture of ingredients bonded together by a heat resistant binder which comprises a mixture of a butadiene-acrylonitrile copolymer and a phenolic resin, said energy transmitting device being operated in a fluid vehicle and including pressure means for engaging the several plates in energy transmitting relation wherein grooves are provided at the surfaces of the faced plates to aid in the control of distribution of the fluid vehicle whereby the temperature of the plates and the facings thereon may be maintained within predetermined limits.

Further objects and advantages of the present invention will be apparent from the following description, reference being had to the accompanying drawings, wherein preferred forms of the invention are clearly shown.

In the drawings:

Figure 1 is a fragmentary view in section of one-half of a multiple disc brake as an example of an energy transmitting device;

Figure 2 is a fragmentary segment of one of the faced friction plates used in the brake shown in Figure 1;

Figure 3 is a fragmentary segment of another type of brake disc which may be used in the brake shown in Figure 1;

Figure 4:
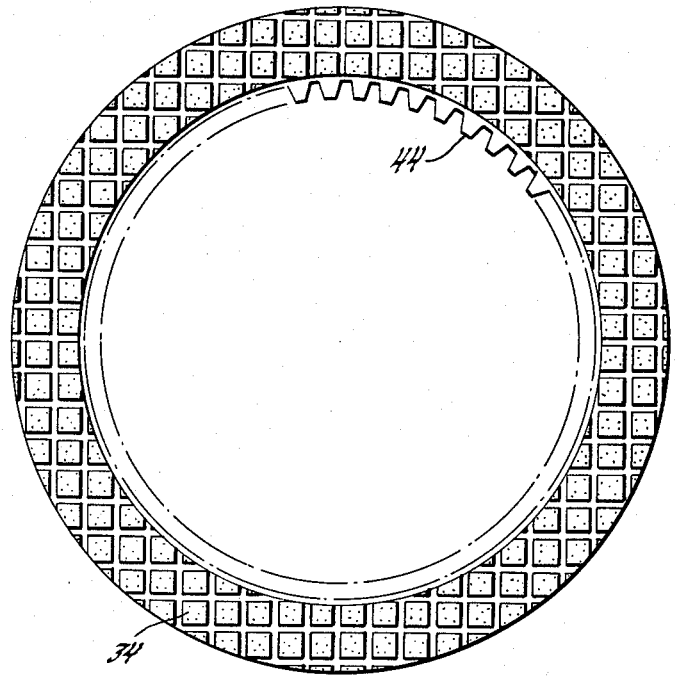
Figure 4 is a plan view of still another type of brake disc showing a different type of facing.
Figure 5:
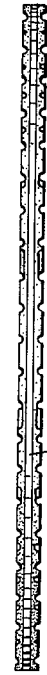
Figure 5 is a side view of the plate shown in Figure 4.

The use of friction materials as facings for clutch plates is well known in the art. These friction materials vary widely in their constituency whereby a friction material having defined physical characteristics may be selected for a specific use. Certain friction materials that have been extremely useful in connection with clutches such as are used in automatic transmissions are clearly described in copending application S.N. 392,596, now Patent No. 2,733,797, assigned to the assignee of the present invention. These facings are of a porous nature whereby the passage of the fluid medium used in connection with the clutch is facilitated whereby the fluid is forced through the porous facing upon engagement of the clutch plate to permit satisfactory engagement and simultaneously to help cool the facing. In certain instances these clutch plates are composite in form, using alternate rings of a porous fibrous facing material and cork for obtaining definite frictional qualities.

While these nonmetallic facings are highly desirable in an automatic transmission they do not have sufficient heat resistance to function in a desired manner in a multiple disc type brake wherein the brake operates in a fluid vehicle. Brakes of this character offer many advantages over the usual type of band brake, for example, they operate without the usual fade, they are smoother in operation and due to the ability to utilize a plurality of plates, they provide any desired area of braking surface within reason. However, disc type brakes using nonmetallic facings have long been impractical. Substantially nonmetallic friction materials as described in the aforementioned application do not have sufficient heat resistance to operate over long periods of time in a brake. This is due to the fact that the temperatures involved in the brake are considerably higher than those which prevail in wet clutch installations. Furthermore, a substantially porous material of the type used in clutches is not altogether satisfactory in a brake since it is not sufficiently hard and wear resistant to yield a satisfactory life.

Referring to the drawings, Figure 1 shows a fragmentary view of a multiple disc type brake assembly at 20 wherein only one-half of the assembly is shown. The assembly comprises a stationary housing 22 provided with a bearing member 24 which supports a rotatable spindle 26. Within the housing 22 is a pressure member 28 actuated through a shaft 30 which connects to a pressure servo (not shown). A brake pack noted at 32 comprises a plurality of faced and unfaced plates. In this instance the faced plates, shown at 34, are splined at their inner peripheries to the member 36 which is splined on a portion of the spindle 26. Alternately disposed between the faced plates are plain steel plates 38 which are splined at their outer peripheries in grooves in the member 40 which is secured to the housing 22. A waved type of return spring is indicated at 43, its function being to disengage the brake pack 32 upon removal of pressure by the servo during periods that the brake is not in use. Within the housing 22 is a fluid vehicle, such as oil, which is pumped by pump means 41 over the plates in the brake pack 32. This flow of oil maintains the facings at a controlled temperature due to its cooling action and controlled flow between the plates. The cooling fluid may be pumped continuously during rotation of the spindle 26 or it may be supplied intermittently only during periods of engagement of the pack. When the pack is disengaged, the plates are in expanded condition, as shown, wherein oil passes between the faced plates and the unfaced plates. The faced plates have a friction facing coextensively bonded at either side thereof, to be explained hereinafter in more detail. The facings of these plates are preferably grooved in various configurations as shown in Figures 2, 3, 4, 5 and 6. The splines for the faced plates may be as shown in Figure 2 on the inner periphery thereof at 44, or as shown in Figure 3 on the outer periphery thereof as at 46. This makes no difference in the operation of the device providing the unfaced plates are splined in the opposite manner so that the two sets of plates, namely faced and unfaced, operate as two units and normally rotate relative to one another when the brake is in non-engaging position due to the pressure member 28 being out of pressure engaging contact with the brake pack.

Figure 6:
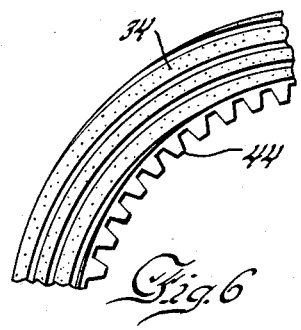
Figure 6 shows a fragmentary segmental view of another type of faced plate.

The surface configurations on the facings may take the form of grooves that are tangential to the circle of less diameter than the plate as shown in Figure 2, they may be radial as shown in Figure 3, they may be of a waffle pattern as shown in Figure 4, they may be spiral as shown in Figure 6 or they may include combinations of the several types of grooving. Similarly, concentric grooves as shown in dotted lines at 50 in Figure 2 may be added to radially grooved plates or radial grooves may be added to the spirally grooved plates, etc. In all cases the grooving is utilized to control the oil flow between the plates during their engagement and disengagement whereby the plates are engaged more smoothly, have desired frictional properties and are maintained at controlled temperatures during the operation of the brake. While this disclosure is directed to friction facings disposed on both sides of the metal discs, it is to be understood that a facing may be used on one side of each disc if desired whereby no plain steel plates will be used and any deviation of this character is fully within the scope of our invention.

Specifically the friction material used as the plate facing as disclosed herein is compounded by uniformly mixing several desirable dry ingredients and then wetting said ingredients thoroughly with a resinous binder of a high temperature type whereupon the wetted mixture is preferably extruded into sheet-like form and cured. The sheet-like material may be stamped out either prior to curing or after curing into discs or annuli of the desired shape which are then preferably attached as by cementing to metal backing plates or supports so as to form the complete plate which may then be assembled in a multiple plate brake structure.

The most important factor to the success of this invention is the high heat resistance of the substantially nonmetallic brake material. This heat resistance may be attributed to the several dry ingredients used therein together with the very high heat resistant binder used to bind the several ingredients together into a dense and substantially non-porous plate or sheet.

Since the facing material is dense and substantially non-porous, it is desirable to have some sort of a relief configuration on the surface of the discs so as to control the flow of the fluid vehicle, which is usually oil, during operation of the brake. Thus, when the brake is acted upon to move to energy transmitting relation between the several parts thereof, it is necessary to control the flow of oil from between the plates so that substantial quantities of oil are eliminated therebetween to permit the plates to engage. At the same time, this flow of oil moving through the relief configurations or grooves on the face of the discs tends to remove excess heat as it is formed. It is understood, of course, that the grooves or configurations in the surface of the plate may be made by either compressing the same into the surface of the plate or the disc prior to curing of the resinous binder at an intermediate curing stage or may be cut or turned into the surface of the plate before or after the bonder has been cured, any such expedients being well known in the art.

The cured facing is then preferably bonded coextensively to the surface of a metal supporting disc through the medium of a cement which may be of a similar nature to the binder material or which may be of an entirely different formulation, the only limitation being that the bonding cement is compatible with the binder in the disc and will form a bonding continuity therewith so that the facing is maintained in coextensive relation to the support.

An important factor to the success of this invention is the inclusion of a new material in the combination of ingredients that are used in the facing. This new material is chemically refined vegetable cellulose in finely divided form. Chemically refined vegetable cellulose is non-abrasive, is relatively inert toward acids, alkalis, oils, solvents, etc., and is dimensionally and thermally stable when used in a combination with other specific ingredients and with specific binders in facing compositions whereby temperatures up to 500° F. may be reached without deterioration of the facing during continuous operation of the brake, while intermittent applications are stable to temperatures as high as 700° F. The stability under high temperature conditions is believed to be the main factor which contributes to the phenomenal improvement of the friction facing in which this material is incorporated in that the friction facing is greatly improved in fade characteristics over a wide range of operating temperatures whereby a very stable friction facing is obtained which yields substantially constant test results over a wide range of temperatures and throughout a wide variety of other operating conditions. Furthermore, because of its low density, the alpha cellulose reduces the overall weight of the facing while improving its strength.

Chemically refined vegetable cellulose is a product obtained by chemically refining cellulosic materials, such as wood, as distinguished from cotton, by conventional wood pump treating processes as are well known in the paper industry, for example, the sulfite or Kraft processes.

The final product is alpha cellulose, the purity of which is determined by the degree of chemical refinement used. It is apparent that the higher the purity, the more resistant the material will be to heat, acids, alkalis, etc.

This refined product is suitably comminuted into a low density powder. This physical condition is important since fibers or filaments tend to mat and are more difficult to mix, etc.

For exemplary purposes, the following dry mixes may be used:

| | Parts | Percent |
|---|---|---|
| (1) Asbestos fiber | 200 | 45.4 |
| Mica (impalpable powder) | 160 | 36.4 |
| 90 mesh cork dust | 30 | 6.8 |
| Chemically purified vegetable cellulose (density 28 lbs. per cu. ft.) | 50 | 11.4 |
| (2) Asbestos fiber | 200 | 45.4 |
| Silica powder (water floated) | 160 | 36.4 |
| 90 mesh cork dust | 30 | 6.8 |
| Chemically purified vegetable cellulose (density 28 lbs. per cu. ft.) | 50 | 11.4 |
| (3) Asbestos fiber | 200 | 45.4 |
| Silica powder (water floated) | 75 | 17 |
| Mica (impalpable powder) | 75 | 17 |
| 90 mesh cork dust | 40 | 9.2 |
| Chemically purified vegetable cellulose (density 28 lbs. per cu. ft.) | 50 | 11.4 |
| (4) Asbestos fiber | 39 | 47 |
| Silica powder | 15 | 18.1 |
| Mica | 15 | 18.1 |
| Chemically purified vegetable cellulose | 8 | 9.6 |
| Cork dust | 6 | 7.2 |
| (5) Asbestos fiber | 17 | 21.3 |
| Chemically purified vegetable cellulose | 21 | 26.3 |
| Silica powder | 7 | 8.7 |
| Silica gel | 10 | 12.5 |
| Antimony oxide | 18 | 22.5 |
| Cork dust | 7 | 8.7 |

(All parts expressed by weight.)

Certain ingredients in the above formulations may be varied, for example, the quantity of chemically refined vegetable cellulose may vary in accordance with the density thereof. Thus, when using a cellulose with a density of 9 pounds per cubic foot, the quantity of the ingredient may be decreased from that shown above to a figure of from 3% to 4% by weight. In this case, the volume of the mix remains substantially constant due to the increased volume of the lower density material. In general, this ingredient may vary from 3% to 20% by weight of the dry mix with densities of between 9 and 28 lbs. per cubic foot.

In all cases, the density of the chemically refined vegetable cellulose varies inversely as the particle size (expressed in microns). Chemically refined vegetable cellulose can be purchased on the open market under the trade name "Solka Floc" manufactured by the Brown Company or "Alpha Dust" produced by the Weyerhauser Lumber Company.

In general, when the percentage of the chemically refined vegetable cellulose is raised, the percentage of asbestos fiber will decrease substantially proportionately so that the percentage of asbestos fiber may go as low as 12% when large quantities of chemically refined vegetable cellulose are used, although as hereinafter noted, this condition does not always prevail.

The length of the asbestos fiber is not important, although short fibers are preferable in plate facings, whereas mixtures of short and medium fibers are more desirable where structural strength is desired for use in bands, and like, where bending is required in the manufacture of the band.

The cork dust is another ingredient that may be varied within rather wide limits. In fact, the 90 mesh cork dust (capable of passing a 90 mesh screen) can be increased to a figure of about 25% by weight if sufficient binder is used. Also the mesh size of the cork dust controls the quantity to some degree. We have found in this instance that cork dust having a mesh size larger than 50 is not desirable.

Silica, in all cases, is used as an abrasive material and may be varied as is well known in the art to obtain desired frictional characteristics. Metal powders, such as aluminum, iron, lead, copper, brass, copper-lead, etc. in flake or granular form alone or in combination, may be included in the mix for controlling wear and varying the friction and heat characteristics thereof if desired. These modifications come fully within the scope of our invention and are well known in the art.

The two formulations which follow show variations in proportions as have been explained hereinbefore.

|  | Parts | Percent |
|---|---|---|
| (1) Asbestos (short fiber) | 60 | 19.5 |
| Chemically purified vegetable cellulose (density 9 lbs. per cu. ft.) | 36 | 11.7 |
| 90 mesh cork dust | 80 | 26.0 |
| Silica powder (water floated) | 132 | 42.8 |
| (2) Asbestos (short fiber) | 170 | 37.8 |
| Asbestos (medium fiber) | 80 | 17.8 |
| 90 mesh cork dust | 80 | 17.8 |
| Chemically purified vegetable cellulose (density 9 lbs. per cu. ft.) | 70 | 15.6 |
| Silica powder (water floated) | 50 | 11 |
| (3) Copper powder | 30 | 37 |
| Lead powder | 4 | 4.9 |
| Asbestos fiber (short) | 20 | 24.8 |
| Asbestos fiber (medium) | 6 | 7.4 |
| Cork dust | 7 | 8.7 |
| Chemically purified vegetable cellulose | 4 | 4.9 |
| Silica powder | 10 | 12.3 |

In all of the hereinbefore noted formulations, the mixture of the dry ingredients is preferably tumbled, with wooden blocks, for about 45 to 50 minutes to assure complete blending and mixing of the ingredients. These thoroughly mixed dry ingredients are then blended with a binder preferably in a water cooled Baker-Perkins mixer for about 25 minutes. One suitable binder may include 113 parts butadiene-acrylonitrile copolymer-phenol-formaldehyde blend (in proportions of about 1 to 3 parts); 30 parts phenol-formaldehyde liquid resin, in butyl alcohol (50% resin solids); 15 parts methyl isobutyl ketone; 40 parts solvent (butyl alcohol or related organic alcohol), and 5% hexamethylene tetramine. This binder is a very important factor in the success of the invention. It appears that the butadiene-acrylonitrile copolymer together with the phenol-formaldehyde resin form a binding material which has exceptionally fine heat resisting qualities. These qualities in combination with the heat resisting materials in the facing, together with the chemically purified vegetable cellulose, provide a final material which has the desired heat resistance. In general butadiene-acrylonitrile copolymer with phenol-formaldehyde resin in proportions in the order of about 1 to 3 makes an excellent binder for this specific purpose.

It is apparent that in place of the phenol-formaldehyde resin any other temperature resisting binder including a thermosetting resin and a butadiene-acrylonitrile copolymer may be used for this purpose if the binder will meet the requirements set forth. In this connection, the volume of binder used will vary in accordance with the volume of the dry mix and the consistency desired for future purposes. Thus, sufficient binder is used to provide a mixture capable of extrusion, molding, etc., as the case may be. After the binder and the dry ingredients are mixed thoroughly, the material may be molded or extruded in sheet-like form. The mixture extrudes easily into a strip, for example, about 6" wide and from .032" to .075" thick. This strip material, after cutting to desired shape and length, is placed between non-adhering, heat resistant separators in stacks with a dead weight thereon sufficient to maintain flatness and is cured. The cure may take two different forms in accordance with the method used to provide grooved configurations in the surface of the discs. The first procedure contemplates a progressive cure of one hour at about 200° F., one hour at 280° F. and finally one hour at 310° F. The facing is then bonded to the surface of the metal backing member through the use of a suitable cement and is then heated for about one hour and thirty minutes at 310° F. under a pressure in the order of 200 pounds per square inch. After the facing has been cooled the grooving may be machined into the surface thereof after which the entire plate is heated for an additional one hour at 375° F.

An alternative method of curing comprises one-hour cures at each of three temperatures, namely 200° F., 280° F., and 375° F. Finally the facing is bonded by a suitable cement to a metal backing member and is heated for one hour and thirty minutes at 375° F. under a minimum pressure of about 200 pounds per square inch. The hot plate is then machine grooved immediately before cooling.

As mentioned heretofore it is possible to impress the grooves in the surface of the plate during the initial stages of the cure if the separators have the configurations thereon. In this instance it is desirable to impress an increased load on the stack of plates after the first hour of curing has been passed to cause the impression of the grooves into the surface of the plates.

In all cases the cement may be a phenol-formaldehyde base cement as disclosed in Schultz Patent 2,507,682, or the cement may be similar in character to the binder used in the mix, namely a butadiene-acrylonitrile-phenol-formaldehyde mixture, the only necessary requirement is that the cement is heat resistant and is compatible with the binder used in the friction material.

It is understood that the specific curing procedures may vary as to time, temperature and pressure and that the above figures are exemplary of suitable processing techniques that have produced very satisfactory plates and are in no way limiting.

We have found that friction plates made in accordance with this invention will outlast the conventional types of fiber plates or fiber-cork combination plates many times under conditions of elevated temperatures, for example, the present plate may be heated for eight hours at 600° F. in a forced air oven without, in any way, affecting its physical appearance or its operational characteristics. The same material heated six hours at 700° F. will show some embrittlement although the facing is still useful. On the other hand, a conventional type of porous plate using a resin impregnated fiber facing as described in S.N. 395,512, now Patent No. 2,802,402, will disintegrate at 600° F. within two hours. Furthermore, the present plate shows more consistent characteristics in dynamometer and field tests.

While the forms of embodiment of the invention as herein disclosed constitute preferred forms, it is to be understood that other forms might be adopted, as may come within the scope of the claims which follow.

What is claimed is as follows:

1. A friction element for use in a brake or the like, comprising a steel supporting element having a friction facing coextensively bonded thereto, said facing consisting of, in percentages by weight, asbestos fiber 45.4% to 47%, together with from 17% to 36.4% of at least one of the materials taken from the class consisting of silica powder and mica, alpha cellulose about 10% to 11.4% and cork dust 6.8% to 9.2%, said ingredients being in a homogeneous mixture and being bonded together into a dense nonporous heat resisting sheet by means of a binder comprising a phenol-formaldehyde-butadiene acrylonitrile copolymer blend, wherein said sheet is bonded coextensively to said supporting element by means of a cement compatible with said binder.

2. The friction facing defined in claim 1 wherein small quantities of metal powder are dispersed therethrough for varying the friction qualities of the facing.

3. The friction facing defined in claim 1 wherein the facing material is bonded to a strong metal supporting member by means of a heat resisting cement compatible with the binder material, said facing including grooved configurations in the friction surface thereof.

References Cited in the file of this patent

UNITED STATES PATENTS

| | | |
|---|---|---|
| 1,875,095 | Milan | Aug. 30, 1932 |
| 1,978,687 | Pearmain et al. | Oct. 30, 1934 |
| 2,457,003 | Spokes | Dec. 21, 1948 |
| 2,581,926 | Groten et al. | Jan. 8, 1952 |
| 2,598,289 | Newman | May 27, 1952 |
| 2,643,234 | Backus | June 23, 1953 |
| 2,657,773 | Driscoll | Nov. 3, 1953 |
| 2,686,140 | De Guage | Aug. 10, 1954 |
| 2,690,248 | McDowall | Sept. 28, 1954 |

FOREIGN PATENTS

| | | |
|---|---|---|
| 1,095,884 | France | Dec. 29, 1954 |